(12) United States Patent
Miyata

(10) Patent No.: US 11,822,985 B2
(45) Date of Patent: Nov. 21, 2023

(54) IMAGE FORMING APPARATUS AND CONTROL METHOD THEREOF

(71) Applicant: CANON KABUSHIKI KAISHA, Tokyo (JP)

(72) Inventor: Takaaki Miyata, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/136,247

(22) Filed: Dec. 29, 2020

(65) Prior Publication Data

US 2021/0216835 A1    Jul. 15, 2021

(30) Foreign Application Priority Data

Jan. 9, 2020 (JP) ................. 2020-002433

(51) Int. Cl.
| | | |
|---|---|---|
| *G06F 15/177* | (2006.01) | |
| *G06F 9/00* | (2006.01) | |
| *G06K 15/00* | (2006.01) | |
| *G06F 3/12* | (2006.01) | |
| *G06F 9/4401* | (2018.01) | |
| *G06F 9/445* | (2018.01) | |

(52) U.S. Cl.
CPC ........... *G06K 15/401* (2013.01); *G06F 3/122* (2013.01); *G06F 9/4401* (2013.01); *G06F 9/445* (2013.01); *G06F 9/4406* (2013.01)

(58) Field of Classification Search
CPC ..... G06K 15/401; G06F 3/122; G06F 9/4401; G06F 9/4406; G06F 9/445
See application file for complete search history.

(56) References Cited

U.S. PATENT DOCUMENTS

| | | | | |
|---|---|---|---|---|
| 9,075,751 B2* | 7/2015 | Sakthikumar | ....... | G06F 12/1425 |
| 2008/0270652 A1* | 10/2008 | Jeansonne | ............... | G06F 21/53 |
| | | | | 710/108 |
| 2009/0187699 A1* | 7/2009 | Cho | .................... | G06F 12/0246 |
| | | | | 711/E12.007 |
| 2011/0145916 A1* | 6/2011 | McKenzie | .............. | G06F 21/53 |
| | | | | 718/1 |
| 2014/0006692 A1* | 1/2014 | Berntsen | ............... | G06F 3/0622 |
| | | | | 711/103 |
| 2015/0235029 A1* | 8/2015 | Morishige | ............. | G06F 21/572 |
| | | | | 713/1 |
| 2017/0034120 A1 | 2/2017 | Kozawa | | |
| 2018/0173421 A1* | 6/2018 | Sela | ......................... | G06F 21/31 |
| 2018/0329774 A1* | 11/2018 | Colombo | ............ | G06F 11/3065 |

FOREIGN PATENT DOCUMENTS

JP    2017-033310 A    2/2017

* cited by examiner

*Primary Examiner* — Xuxing Chen
(74) *Attorney, Agent, or Firm* — Venable LLP

(57) ABSTRACT

An image forming apparatus comprises a non-volatile memory storing start-up firmware a volatile memory having a memory space commonly available for the start-up firmware and an operating system of the image forming apparatus; and a control unit configured to copy, to the memory space, a setting value of a setting item for write-protecting the non-volatile memory, among setting items included in the start-up firmware, wherein the operating system acquires and checks the setting value copied to the memory space.

9 Claims, 3 Drawing Sheets

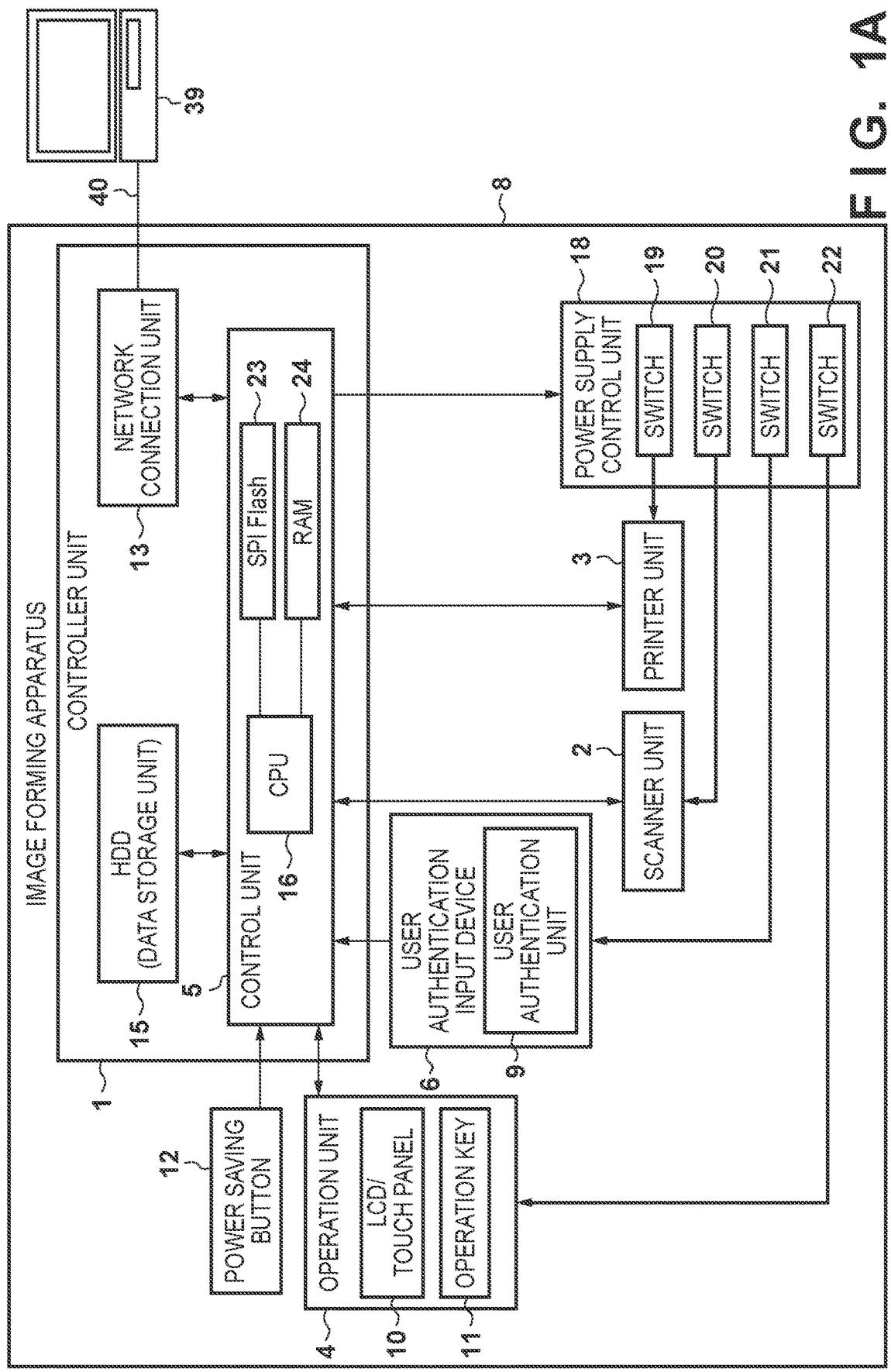

IMAGE FORMING APPARATUS AND CONTROL METHOD THEREOF

BACKGROUND OF THE INVENTION

Field of the Invention

The present invention relates to an image forming apparatus, and a control method thereof.

Description of the Related Art

In recent years, many cases have been reported in which, in a device that can be connected to a network, start-up firmware pre-installed in the device is altered by unauthorized access or execution of an unauthorized program. As a countermeasure against such alteration, there is a method of setting a non-volatile memory storing the start-up firmware to be write-protected. That is, one of setting values for setting items of the start-up firmware is a setting item for write-protecting all blocks of the non-volatile memory, and by setting this to be enabled, it is possible to prevent the alteration of the start-up firmware.

For example, in a case where the start-up firmware is a BIOS, a setting tool referred to as a set-up menu is prepared in the BIOS, and a user can execute the set-up menu to check and further modify a setting value of each setting item. However, unlike a personal computer, in a case of an embedded device such as an image forming apparatus, it may be a concern in a security aspect that the setting values of the setting items of the start-up firmware can be modified by using the set-up menu. That is, since execution of the set-up menu can disable settings for write-protecting all blocks of the non-volatile memory, performing such settings increases the risk of the alteration of the start-up firmware after product shipment. On the other hand, by making the execution of the set-up menu disable, it is possible to control modification of the setting value of each setting item of the start-up firmware to be disable, but at the same time, the setting values cannot be checked. Thus, there is no method of checking whether or not the non-volatile memory storing the start-up firmware is write-protected, and it is not possible to check whether or not there is a risk of alteration of the start-up firmware.

Japanese Patent Laid-Open No. 2017-33310 proposes that an IP address generated by a BIOS is written into a RAM region accessible by an operating system, and the IP address is used by the operating system, when an HDD is replaced. Generally, many servers are operated by using fixed IP addresses, and their IP addresses are typically stored on hard disks. Therefore, even when the HDD of the server is replaced and operated, the BIOS can generate the IP address before the replacement of the HDD in the above-described invention. The operating system refers to or sets this information, thereby allowing the server to be operated by using the same IP address before and after the replacement of the hard disk.

However, the conventional technology described above has the problems described below. For example, in the conventional technology described above, the operating system can refer to the IP address generated by the BIOS, but the operating system cannot refer to setting information for write-protecting all blocks of the non-volatile memory. That is, in a case where the execution of the BIOS set-up menu is made disable, it becomes not possible to refer to the setting information for write-protecting all the blocks of the non-volatile memory.

SUMMARY OF THE INVENTION

The present invention enables realization of a mechanism for suitably checking a risk of alteration of information stored in a non-volatile memory while allowing an OS to refer to a setting item related to write-protection of the non-volatile memory.

One aspect of the present invention provides an image forming apparatus comprising: a non-volatile memory storing start-up firmware a volatile memory having a memory space commonly available for the start-up firmware and an operating system of the image forming apparatus; and a control unit configured to copy, to the memory space, a setting value of a setting item for write-protecting the non-volatile memory, among setting items included in the start-up firmware, wherein the operating system acquires and checks the setting value copied to the memory space.

Another aspect of the present invention provides a control method of an image forming apparatus including a non-volatile memory storing start-up firmware, and a volatile memory having a memory space commonly available for the start-up firmware and an operating system of the image forming apparatus, the control method comprising: copying, to the memory space, a setting value of a setting item for write-protecting the non-volatile memory, among setting items included in the start-up firmware; and acquiring and checking, by the operating system, the setting value copied to the memory space.

Further features of the present invention will be apparent from the following description of exemplary embodiments with reference to the attached drawings.

BRIEF DESCRIPTION OF THE DRAWINGS

FIG. 1A is a block diagram illustrating a configuration of an image forming apparatus according to an embodiment.

DESCRIPTION OF THE EMBODIMENTS

Figure 1B:
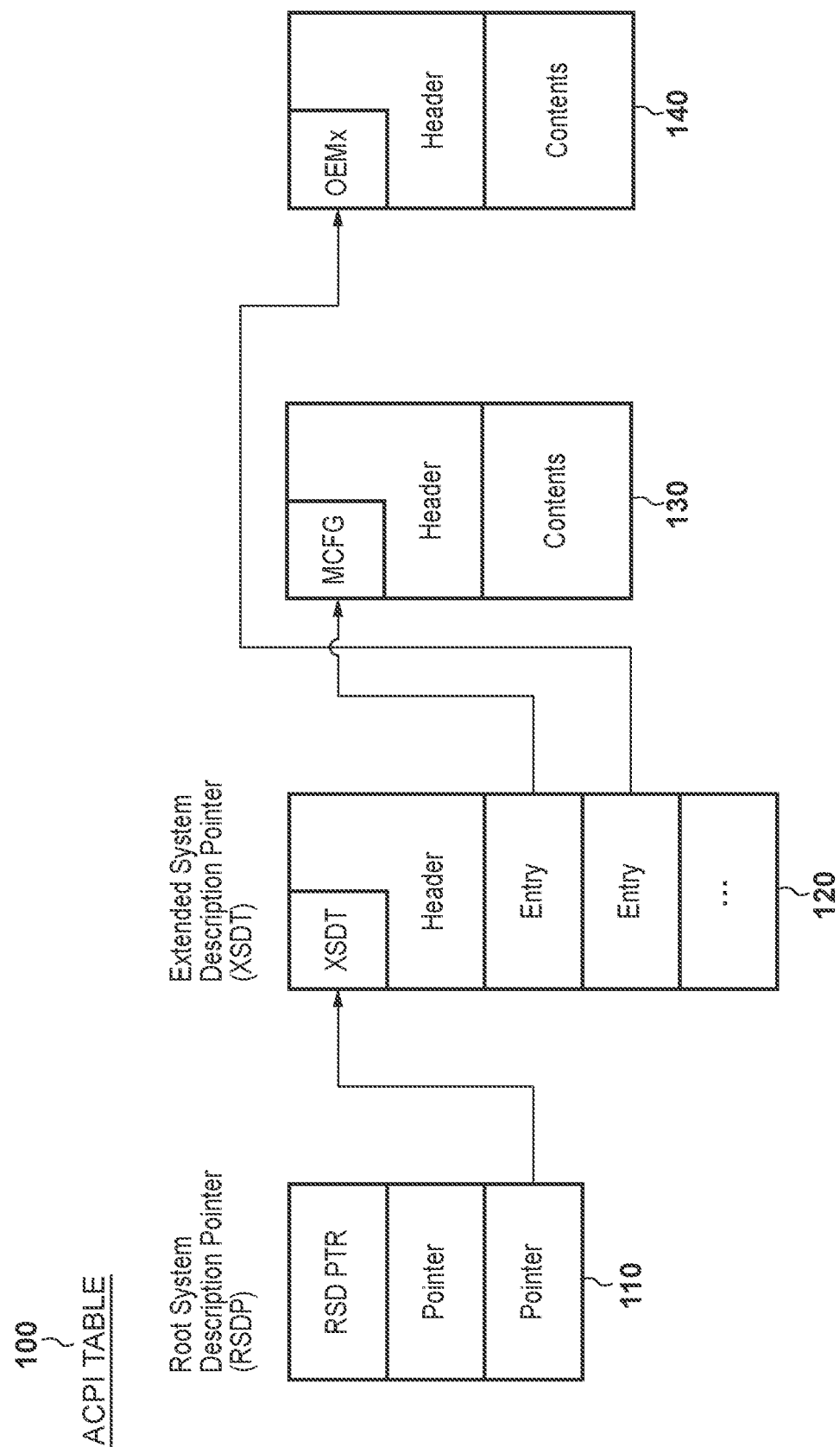
FIG. 1B is a configuration diagram of an ACPI table according to the embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that, as an image forming apparatus according to an embodiment, a multi-function peripheral (a digital multi-function peripheral (MFP)) will be exemplified and described. However, the range of application is not limited to a multi-function peripheral, and may be an image forming apparatus.

Configuration of Image Forming Apparatus

Embodiments of the present invention will be described below. First, a configuration example of an image forming apparatus 8 according to the present embodiment will be described with reference to FIG. 1A.

The image forming apparatus 8 includes a controller unit 1, a scanner unit 2, a printer unit 3, an operation unit 4, a user authentication input device 6, a power saving button 12, and a power supply control unit 18. The user authentication input device 6 is provided with a user authentication unit 9, and has a function of authenticating a user in order to perform authenticated printing. The power supply control unit 18 includes switches 19 to 22. Each of the switches 19 to 22 is a switch configured to switch between supply and stop of power supply to each of loads. The switch 19 switches the power supply to the printer unit 3. The switch 20 is a switch configured to switch the power supply to the scanner unit 2. The switch 21 is a switch configured to switch between supply and stop of the power supply to the user authentication input device 6.

The operation unit 4 includes an LCD/touch panel 10, and an operation key 11. The LCD/touch panel 10 displays information to a user, and displays a button image and then presses a button with a finger or the like to enable interactive operation. The operation key 11 is configured with physical button switches or the like, for number buttons such as the number of sheets to be printed, a copy button, a stop button and the like that are to be frequently used.

The power saving button 12 is physically disposed near the operation unit 4 or on the same unit as the operation unit 4, but is a switch for returning from a power saving mode. In other words, the power saving button 12 is configured to be electrically separated so that pressing a button can be detected even in a case where the operation unit 4 has been powered off by the switch 22. As illustrated in FIG. 1A, the power saving button 12 is provided separately from the operation unit 4 and is independently connected to a CPU 16. This power saving button 12 can be pressed by a user to shift the image forming apparatus 8 to the power saving mode or to toggle the image forming apparatus 8 to a standby mode.

The controller unit 1 includes a control unit 5, an HDD (data storage unit) 15, and a network connection unit 13. The network connection unit 13 is a network interface that accepts a request, for example, through a network 40 or the like from the control terminal 39 that is an external apparatus. The storage unit 15 is an HDD (hard disk drive) for storing received print data, a program for verifying firmware, or the firmware itself. The control unit 5 is mutually connected with these devices, and controls the entire controller unit 1. The control unit 5 includes the CPU 16, an SPI Flash 23, and a RAM 24. The CPU 16 determines whether or not data received from an external interface unit is print data, and executes start-up firmware and an operating system. The SPI Flash 23 is a non-volatile memory that stores the start-up firmware necessary for start-up of the CPU 16. The RAM 24 is a volatile memory to be utilized as a work area that temporarily stores instructions to the CPU 16. Also, in the present embodiment, control firmware (the start-up firmware) stored in the SPI Flash 23 is a BIOS.

The control terminal 39 is not configured to output information equivalent to information for a user to be output to the LCD/touch panel 10, but is a management server configured to input a management command to the image forming apparatus 8 and configured to output the result. Note that the network connection unit 13 is an example of a communication interface. The control terminal 39 can also control the image forming apparatus 8 via the network connection unit 13. According to the present embodiment, the network 40 may be implemented as TCP/IP communication on Ethernet or as serial transfer communication on an RS-232 standard cable. Of course, this does not intend to limit the present invention, and other communication schemes may be applied. The control terminal 39 according to the present embodiment acquires and checks, from the image forming apparatus 8 via the network connection unit 13, setting values of setting items for write-protection of all blocks of the non-volatile memory. This allows an administrator or the like using the control terminal 39 to check that there is no possibility of alteration of the start-up firmware or the like stored in the non-volatile memory, as long as the non-volatile memory is normally write-protected. Alternatively, the administrator can check that there is a possibility of alteration in a case where the write-protection of the non-volatile memory has not been set. Details of a method of acquiring these setting values will be described below.

Further, the RAM 24 may be provided with a memory space to which the BIOS and the operating system are commonly accessible. The BIOS can construct an ACPI table 100 illustrated in FIG. 1B into the memory space on the RAM 24. The ACPI table 100 stores information required to start up a computer system (the image forming apparatus), a method for controlling functions of hardware, and the like, and may be configured as a tree structure, as illustrated in FIG. 1B. The ACPI table 100 starts first from a root system description pointer (RSDP) 110, which points an XSDT 120 table. The extended system description pointer (XSDT) 120 has a plurality of Entries, each of which points some sort of a table. As one example, an MCFG 130 table holds a base address of a setting region memory-mapped for a device on PCI-Express. In addition, in an OEMx table 140, a developer can store any information. In the present embodiment, settings for write-protecting (prohibiting writing into) all the blocks of the non-volatile memory are stored in the OEMx table 140. Of course, the present invention is not intended to be limited, and a destination for storing the settings for write-protecting all the blocks of the non-volatile memory may be implemented by other than the ACPI table 100.

Start-Up Procedure

Figure 2:
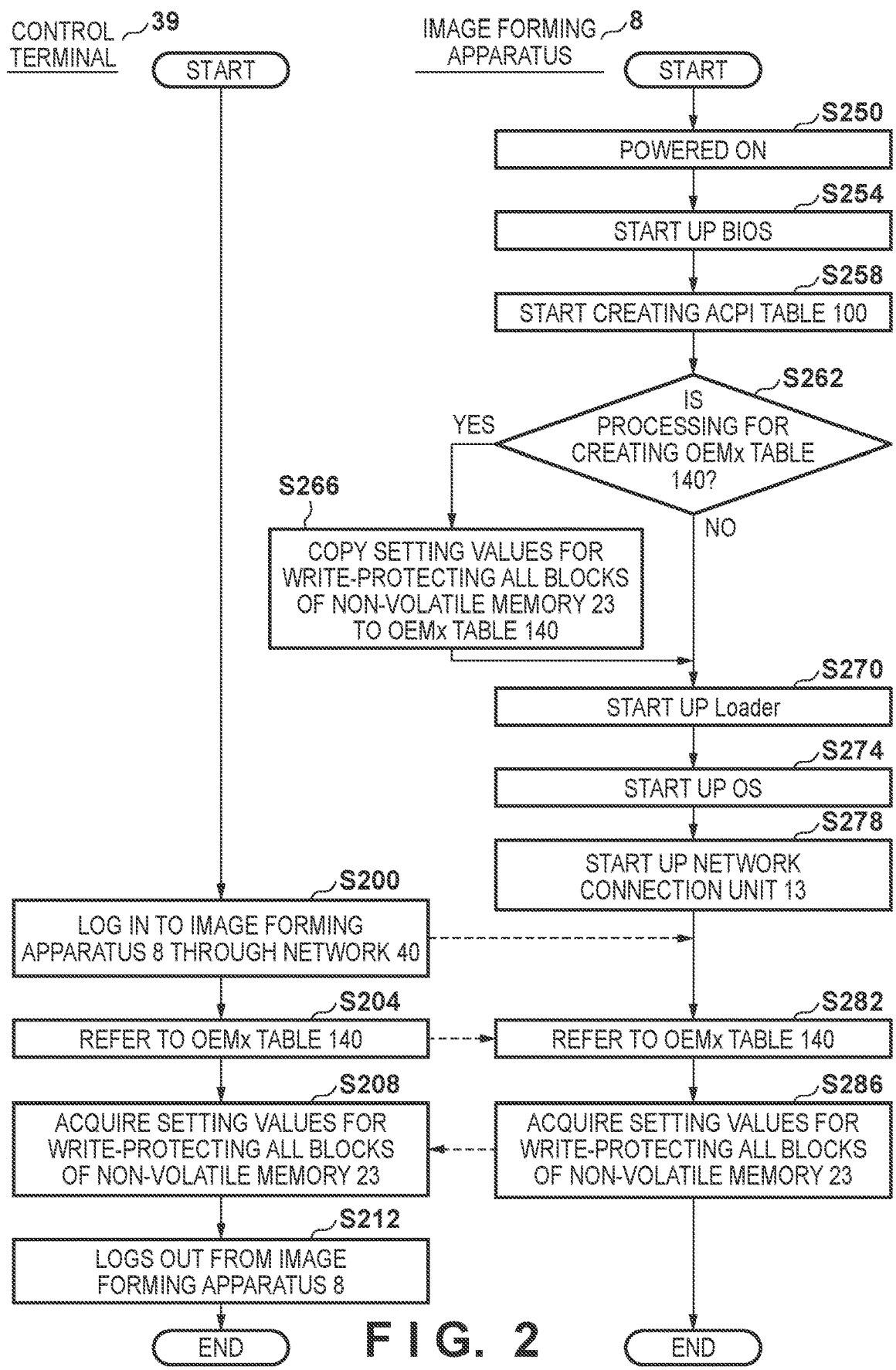
FIG. 2 is a flowchart illustrating start-up processing of a control terminal 39 and an image forming apparatus 8 according to the embodiment.

Next, a start-up procedure in the control terminal 39 and the image forming apparatus 8 according to the present embodiment will be described with reference to FIG. 2. Specifically, a start-up procedure of the control terminal 39 and the image forming apparatus 8, and a state in which the input and output of a management command are performed from the control terminal 39 toward the image forming apparatus 8 are illustrated. More specifically, a process for acquiring the OEMx table 140 of the image forming apparatus 8, that is, setting values for write-protecting all blocks of the non-volatile memory, by the management command will be described. The CPU 16 reads out a control program stored in the SPI Flash 23 or the HDD 15 into the RAM 24 and execute the control program to implement processing of the image forming apparatus 8 described below, for example. Additionally, a CPU of the control terminal reads out a control program stored in a ROM or an HDD into a RAM and executes the control program to implement processing of the control terminal 39 described below.

First, a start-up procedure of the control terminal 39 will be described. In S200, the control terminal 39 logs in to the image forming apparatus 8 through the network 40. As a result, a management command for the image forming apparatus 8 is available from the control terminal 39. Subsequently, in S204, the control terminal 39 refers to the OEMx table 140 of the image forming apparatus 8. The details will be described later, but the operating system of the image forming apparatus 8 refers to the OEMx table 140 in accordance with the request by the control terminal 39. Furthermore, in S208, the control terminal 39 acquires the setting values for write-protecting of all blocks of the SPI Flash 23 which is the non-volatile memory of the image forming apparatus 8. In S212, the control terminal 39 logs out from the image forming apparatus 8 and terminates the processing.

Next, a start-up procedure of the image forming apparatus 8 will be described. In S250, the image forming apparatus 8 is powered on, and in S254, the BIOS is started up in the image forming apparatus 8.

In S258, the BIOS configured to operate on the image forming apparatus 8 starts to create the ACPI table 100 on the RAM 24. When the creation of the ACPI table 100 is started, in S262, the CPU 16 determines whether or not the processing is for creating the OEMx table 140 in the ACPI table 100. When the processing is for creating the OEMx table 140, the processing proceeds to S266, and otherwise, the processing proceeds to S270.

In S266, the CPU 16 copies the setting values for write-protecting all the blocks of SPI Flash 23 to the OEMx table 140 and the processing proceeds to S270. Of course, since the ACPI table 100 can be also referred to after the operating system is started up, the operating system can acquire the setting values for write-protecting all the blocks of the SPI Flash 23. In other words, the copy processing is performed before the operating system is started up when the image forming apparatus 8 is started up.

In S270, the CPU 16 starts up the Loader in the image forming apparatus 8, and in S274, starts up the operating system. Subsequently, in S278, the CPU 16 starts up the network connection unit 13 to establish a communication connection with the control terminal 39 through the network 40. In other words, after that, the login (S200) can be accepted through the network 40 from the control terminal 39.

In S282, the CPU 16 receives the operation in S204 from the control terminal 39 and refers to the OEMx table 140 on the RAM 24. Subsequently, in S286, the CPU 16 acquires the setting values for write-protecting all the blocks of the SPI Flash 23 copied to the OEMx table 140 referred to in S266 described above. Here, the acquisition processing is performed due to receiving the operation in S204 from the control terminal 39, and thus, the CPU 16 transmits the setting values for write-protecting all the blocks of the SPI Flash 23 through the network 40 to the control terminal 39, and terminates the processing. Subsequently, this processing leads to the operation in S208 of the control terminal 39.

As described above, the image forming apparatus according to the present embodiment includes the non-volatile memory that stores the start-up firmware, and the volatile memory that has a memory space commonly available for the start-up firmware and the operating system of the image forming apparatus. In addition, the image forming apparatus copies, among the setting items included in the start-up firmware, the setting values of the setting items for write-protecting the non-volatile memory to the memory space. Additionally, the operating system of the image forming apparatus acquires and checks the setting values copied to the memory space. In this way, the input and output of a management command is performed from the control terminal 39 which is an external apparatus toward the image forming apparatus 8, which allows the control terminal 39 to acquire the setting values for write-protecting all the blocks of the non-volatile memory in the image forming apparatus 8. In addition, according to the present invention, when the start-up firmware is a BIOS, it is possible to refer to setting information for write-protecting all blocks of the non-volatile memory without executing a set-up menu that may be a concern in a security aspect. In this way, according to the present invention, it is possible to suitably check a risk of alteration of information stored in a non-volatile memory while allowing an OS to refer to a setting item related to write-protection of the non-volatile memory. This makes it possible to prevent a BIOS setting value from being changed due to an operation error by a person in charge in a factory.

OTHER EMBODIMENTS

According to the present invention, it is possible to suitably check a risk of alteration of information stored in a non-volatile memory while allowing an OS to refer to a setting item related to write-protection of the non-volatile memory.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-002433 filed on Jan. 9, 2020, which is hereby incorporated by reference herein in its entirety.

What is claimed is:

1. An image forming apparatus comprising:
a non-volatile memory storing start-up firmware
a volatile memory having a memory space commonly available for the start-up firmware and an operating system of the image forming apparatus;
a PCI-Express controlling an access to the non-volatile memory; and
a control unit configured to:
activate the start-up firmware;
in accordance with control of the start-up firmware, copy, from the non-volatile memory to a portion of the memory space provided in a predetermined region of the volatile memory, a setting value of a setting item for write-protecting based on an address in the PCI-Express for accessing to a setting item that prohibits writing into the start-up firmware;

activate the operating system; and in accordance with control of the operating system, acquire the setting value copied to the portion of the memory space provided in the predetermined region of the volatile memory after activating the operating system, without executing a setup menu of the start-up firmware.

2. The image forming apparatus according to claim 1, wherein the setting item for write-protecting the non-volatile memory is a setting item that prohibits writing into all blocks of the non-volatile memory.

3. The image forming apparatus according to claim 1, further comprising:

a communication interface configured to communicate with an external apparatus, wherein the communication interface transmits the setting value copied to the memory space to the external apparatus in accordance with a request from the external apparatus.

4. The image forming apparatus according to claim 3, wherein the communication interface communicates with the external apparatus by serial transfer communication on an RS-232 standard cable.

5. The image forming apparatus according to claim 3, wherein the communication interface communicates with the external apparatus by TCP/IP communication.

6. The image forming apparatus according to claim 1, wherein the start-up firmware is a BIOS, and the setting value of the setting item for write-protecting the non-volatile memory is a setting value of the BIOS.

7. The image forming apparatus according to claim 1, wherein when the image forming apparatus is started up, the control unit copies the setting value of the setting item for write-protecting the non-volatile memory to the memory space.

8. The image forming apparatus according to claim 1, wherein the memory space is an ACPI table.

9. A control method of an image forming apparatus including a non-volatile memory storing start-up firmware, a volatile memory having a memory space commonly available for the start-up firmware and an operating system of the image forming apparatus, and a PCI-Express controlling an access to the non-volatile memory, the control method comprising:

activating the start-up firmware;

in accordance with control of the start-up firmware, copying, from the non-volatile memory to a portion of the memory space provided in a predetermined region of the volatile memory and before starting up the operating system, a setting value of a setting item for write-protecting based on an address in the PCI-Express for accessing to a setting item that prohibits writing into the start-up firmware, among setting items included in the start-up firmware;

activating the operating system; and in accordance with control of the operating system, acquiring the setting value copied to the portion of the memory space provided in the predetermined region of the volatile memory after activating the operating system, without executing a setup menu of the start-up firmware.

\* \* \* \* \*